Oct. 7, 1952     E. C. KIEKHAEFER     2,612,882
CRANKCASE INDUCTION VALVE FOR TWO-CYCLE ENGINES
Filed Sept. 23, 1949     2 SHEETS—SHEET 1

INVENTOR.
Elmer C. Kiekhaefer
BY Andrus & Dealer
Attorneys

Oct. 7, 1952     E. C. KIEKHAEFER     2,612,882
CRANKCASE INDUCTION VALVE FOR TWO-CYCLE ENGINES
Filed Sept. 23, 1949     2 SHEETS—SHEET 2
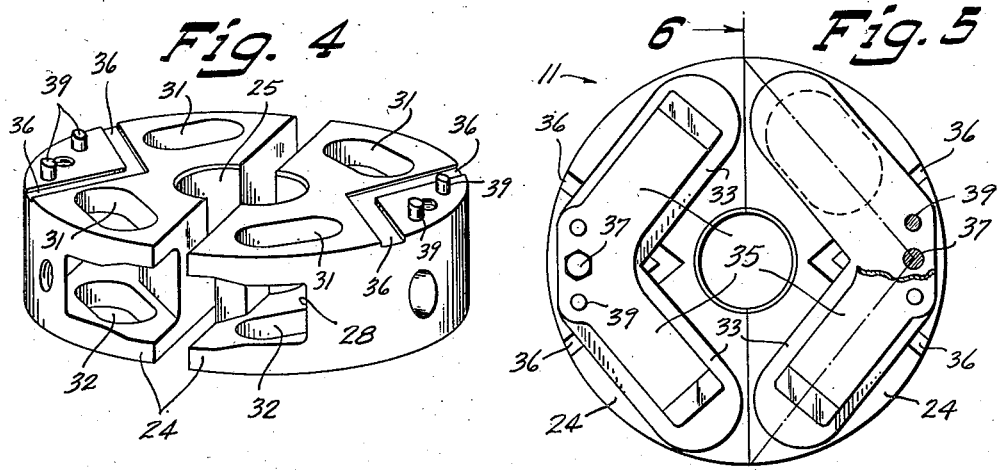
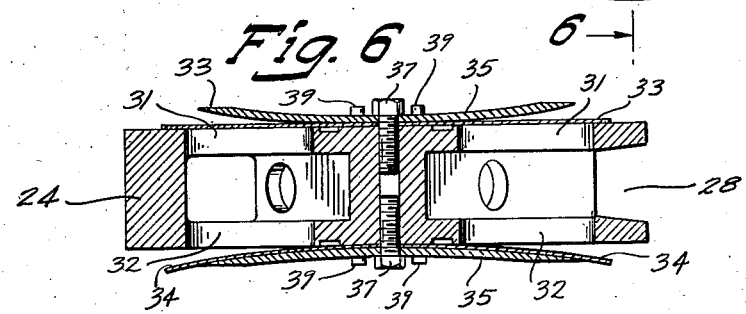
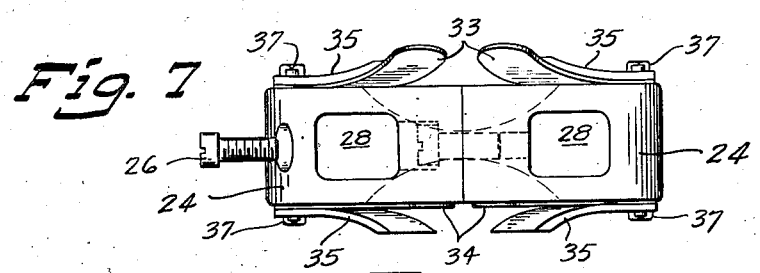
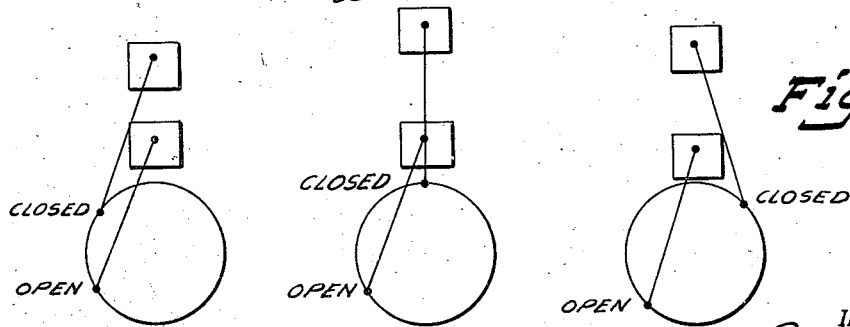
INVENTOR.
Elmer C. Kiekhaefer
BY Andrus & Sceales
Attorneys Patented Oct. 7, 1952

2,612,882

UNITED STATES PATENT OFFICE 2,612,882

CRANKCASE INDUCTION VALVE FOR TWO-CYCLE ENGINES

Elmer C. Kiekhaefer, Cedarburg, Wis.

Application September 23, 1949, Serial No. 117,325

6 Claims. (Cl. 123—73)

This invention relates to two-cycle, internal-combustion engines and particularly to the crankcase induction system and valve means controlling the same for alternate firing, adjacent cylinders of such engines.

The invention provides a valve unit to be assembled on the crankshaft providing an induction passage extending between and opening into separate crank chambers and having oppositely disposed pairs of reed valves controlling the induction of the respective crank chambers. The reed valves are arranged about the crankshaft of the engine and provide for the introduction of a larger fuel charge under conditions which assure greater fuel efficiency and engine power output at high speed.

A principal object of the invention is to adapt crankcase reed valves to high-engine speeds for greater engine output at such speeds under load.

Another object of the invention is to provide for the more complete induction of the fuel mixture into adjacent alternately fired cylinders at high speeds.

A further object is to provide a passage for the flow of fuel mixture into the adjacent crank chambers with a minimum of obstructions and changes of direction of flow.

Another object is to time the induction of the fuel mixture into the adjacent cylinders so that the flow is substantially continuous and proceeds without surging or pulsating particularly at high speeds.

A more particular object is to extend the period of induction of each crank chamber to the commencement of the induction cycle of the adjacent chamber.

Another object is to enlarge the induction cycle of each chamber for maximum scavenging and recharging of the cylinder, affording higher engine speeds and greater engine efficiency.

A further object is to ensure the immediate and full opening of the valves at high speeds without lag and incomplete induction.

Another object is to ensure the immediate and complete closing of the reeds at the end of the induction cycle to prevent back pressure and loss of engine efficiency and eliminate any possibility of fire reaching the carburetor in case of backfiring of the fuel charge in the crank chamber.

Another object of the invention is to provide for valve operation at higher speeds without loss of valve efficiency at the lower engine speeds.

Another object is to introduce the fuel mixture into the crank chamber so as to effect a further or more complete atomization of the liquid fuel within the crank chamber.

Another object is to direct at least a part of the fuel mixture entering the crank chamber into the cylinder below the piston to cool the same.

These and other objects and advantages will be set forth in the following description of a preferred embodiment of the invention as illustrated in the accompanying drawings.

In the drawings:

Fig. 4 is a perspective view of the unassembled valve body members;

Fig. 5 is a plan view of the valve unit;

Fig. 6 is a section taken on line 6—6 of Fig. 5 through the valve ports of one of the valve members;

Fig. 7 is a rear elevation of the valve unit;

Fig. 8 is a diagrammatic illustration of the induction cycle of the engine at low engine speeds;

Fig. 9 is a diagrammatic illustration of the induction cycle at intermediate engine speeds; and Fig. 10 is a diagrammatic illustration of the induction cycle attained at high engine speeds.

Figure 1:
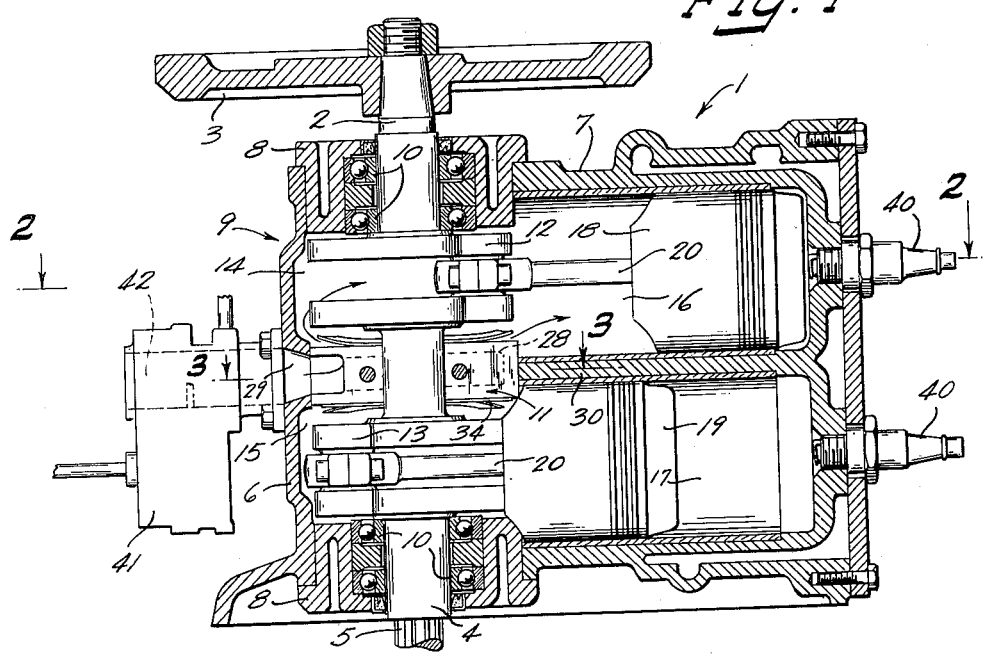
Figure 1 is a side elevation of an engine having two, in-line, alternate-firing cylinders and with portions thereof broken away and sectioned to show the valve unit.
Figure 2:
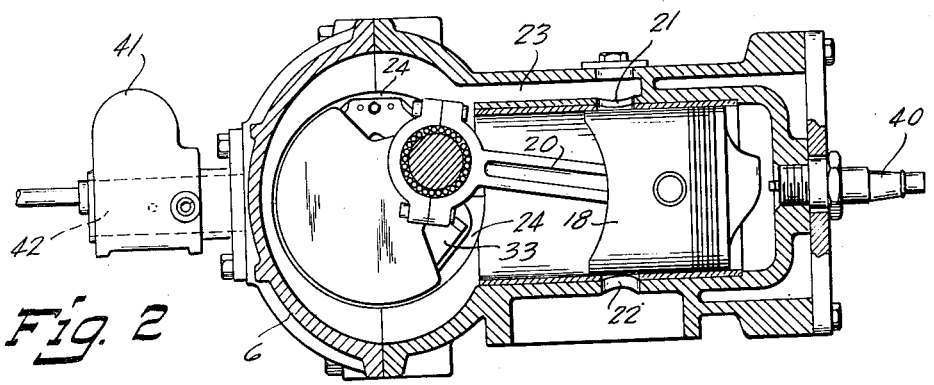
Fig. 2 is a horizontal section through the upper cylinder of the engine shown in Fig. 1 on line 2—2 of Fig. 1.

The engine 1, shown in the drawings, includes the vertically disposed crankshaft 2 carrying the flywheel 3 at its upper end and adapted to be connected at the lower end 4 to the drive shaft 5 for power transmission.

The crankcase member 6 secured to the cylinder block 7, and the end closure members 8 comprise the crankcase 9 which encloses crankshaft 2. The end bearings 10 supporting crankshaft 2 are carried by members 8, and the bearing and valve unit 11, as will be described, supports crankshaft 2 intermediate upper and lower crank throws 12 and 13. Unit 11 divides crankcase 9 into the respective, separate crank chambers 14 and 15.

The upper and lower cylinder bores 16 and 17 of block 7 open forwardly into chambers 14 and 15, respectively, and carry the pistons 18 and 19, respectively, connected to crank throws 12 and 13 of crankshaft 2 by the rods 20.

The intake ports 21 in one side of each cylinder open into a transfer passage 23 extending alongside the cylinders from the corresponding crank chamber 14 and 15.

The exhaust ports 22 of each cylinder are disposed approximately opposite of ports 21 and open outwardly into exhaust discharge means, not shown.

Intake ports 21 and exhaust ports 22 of each cylinder 16 and 17 are disposed to be covered and uncovered by the respective piston in the operation of the engine, as will be described.

The bearing and valve unit 11 dividing crankcase 9 into the upper and lower chambers 14 and 15 includes the two complementary semi-cylindrical members 24 having a center bore 25 fitting the center section of crankshaft 2 between crank throws 12 and 13 journally supporting the crankshaft.

The outer diameter of members 24 fits accurately the inner dimensions of crankcase 9 to divide the same into the separate airtight chambers, as described. Members 24 are assembled on crankshaft 2 and joined by the screws 26 and assembled in crankcase 9 with the assembly of the crankshaft.

The screw 27 passing through crankcase member 6 secures valve members 24 within crankcase 9 against rotation with crankshaft 2.

Figure 3:
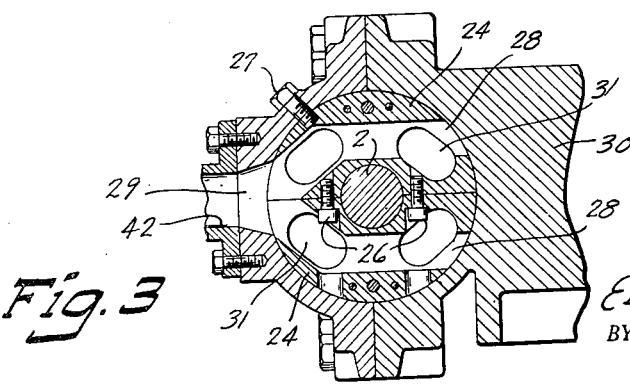
Fig. 3 is a horizontal section through the induction passage of the engine shown in Fig. 1 on line 3—3 of Fig. 1.

The passages 28 in members 23 join forwardly and together register with the opening 29 in crankcase member 6. The passages extend rearwardly on either side of crankshaft 2 and are closed by the section 30 of block 7 intermediate cylinders 16 and 17, as shown in Fig. 3.

The valve ports 31 and 32 in the upper and lower planiform end faces of members 24 opening from passages 28 of the members into chambers 14 and 15, respectively, are controlled by the flexible reeds 33 and 34 which are normally seated flat on the upper and lower faces of the members and over the ports. Each of reeds 33 and 34 comprises a flexible, thin metal member secured at one end adjacent the respective ports 30 and 31 and which is adapted to flex as the opposite free end is lifted by the greater gas pressures on the side of the reeds facing the ports to uncover and open the ports.

The rockers 35 comprising curved rigid metal members are disposed to limit the opening of reeds 33 and 34 and are shaped to distribute the flexing evenly throughout the length of the reeds.

The slots 36 in the upper and lower faces of members 24 at the base of reeds 33 and 34 provide for any accumulation of dirt beneath the reeds which would otherwise interfere with closing of the reeds.

The rockers 35 for adjacent reeds are formed integrally with a flat intermediate section 38 secured to member 24 by the screw 37.

Ports 31 and 32 are symmetrically arranged about crankshaft 2 and the two forward reeds 33 are disposed to open forwardly and toward each other to direct the fuel mixture forwardly and upwardly around the adjacent crank throws 12 and 13 into the interior of chambers 14 and 15, respectively. The two rear reeds 34 of each member 24 are disposed to open rearwardly and toward each other to direct the fuel mixture into the lower end of cylinders 16 and 17 and against the underside of pistons 18 and 19.

Corresponding ports 31 and 32 opening into upper and lower chambers 14 and 15, respectively, are diametrically opposite so that reeds 33 and 34 of one chamber close toward the reeds of the other chamber.

The fixed ends of reeds 33 and 34 are located by the pins 39 which project through section 36 of rockers 35 and are secured by the latter and the screws 37.

In the operation of engine 1, pistons 18 and 19 reciprocate in opposite directions. Cylinders 16 17 are fired alternately by the spark plugs 40 as the corresponding piston reaches the upper end of its stroke providing two power strokes per crankshaft revolution.

Ports 21 and 22 are disposed to be uncovered by pistons 18 and 19 as the pistons approach the lower end of the power stroke, providing for the exhaust of the cylinders through ports 22 and for the recharging of the cylinders by the compressed fuel mixture within the corresponding crank chamber through passages 28 and ports 31. As pistons 18 and 19 move upwardly from the lower position the pistons cover and close ports 21 and 22 and compress the fuel mixture within the cylinders for ignition and the next power stroke.

The carburetor 41 connected to fuel supply means, not shown, is provided with the carbureting passage 42 which is open at one end to receive air for combustion and registers at the other end with opening 29 to deliver the fuel mixture through passages 28 and ports 31 and 32 to chambers 14 and 15, respectively, as will be described.

Pistons 31 and 32, moving upwardly after closing ports 31, effect a reduction air pressure within the respective crank chambers and the induction of fuel mixture into the chambers through ports 31 and 32 which are opened by reeds 33 and 34 in response to the greater pressure on the outward sides of the reeds.

After the outward induction stroke of the pistons and concurrently with each downward power stroke reeds 33 and 34 close the corresponding ports 31 or 32 and the pistons effect a compression of the fuel mixture within the respective crank chambers.

As ports 21 are uncovered by the pistons at the end of the downward power stroke, the fuel mixture is admitted to the respective cylinders through transfer passages 28 from the corresponding crank chambers for recharging of the cylinders as described.

In an engine employing mechanical valves, the low speed induction cycle and that of any higher speeds is fixed and remains the same as that of the induction stroke of the engine, as shown in Fig. 9.

At high speeds, under load requiring a fully open throttle, a full fuel charge is not allowed sufficient time to pass into the crank chambers and the chamber is not filled by atmospheric pressure by the time the piston has reached top dead center and the mechanical valves are closed.

In engines heretofore employing reed valves, the induction cycle at various speeds can be extended according to the engine speed but without advantage. At high speeds the chamber continues to be unfilled as the piston travels downwardly in the power stroke and may not be filled until the piston has traveled half the distance of its full downward stroke.

In such cases where the induction cycle continues into the power downstroke of the piston the amount of fuel mixture actually inducted is reduced by the extent to which the crankcase volume has been reduced by the movement of the piston traveling downwardly. In such cases, furthermore, where the induction cycle continues into the compression cycle, the compression cycle is reduced by a corresponding amount and the fuel transfer and scavenging is reduced correspondingly.

Intake passage 41 of carburetor 40 and passages 28 are substantially in straight line providing a columnar, laminar flow of the fuel mixture through the passages directly to and serving chambers 14 and 15 through ports 31 and 32, respectively. The column of fuel mixture, moving at high speed through passages 41 and 28, attains a moment of inertia according to its mass and velocity which is directed against reeds 33 and 34.

The column of fuel mixture by reason of its velocity holds the reeds open at high engine speeds against their normal closing action and continues to move into the chamber after the crankshaft has passed top dead center of rotation and the piston is moving downwardly. The fuel mixture column in passages 41 and 28 thus continues the induction cycle beyond the induction stroke of the piston.

According to the invention, the induction system provides for continuation of the induction cycle until the beginning of the induction stroke of the piston of the adjacent crank chamber. For this purpose, the size of ports 31 and 32 and the flexibility and other characteristics of reeds 33 and 34 must be established within limits for an engine of given displacement and crankshaft rotation at high speed.

The reeds should be sufficiently stiff so that they will close positively and quickly when the pressure within the crank chambers on one side of the reeds reaches the pressure directed against the opposite side of the reeds by the column of fuel mixture. The reeds, however, need not be as stiff as would be required in other induction systems by reason of the fact that the closing of the reeds occurs nearer the end of the induction stroke and when the linear velocity of the piston is less and more time for the closing is allowed. The reeds may, therefore, be more readily adapted to low speed operation.

The size of ports 31 and 32 determines the size of reeds 33 and 34 and should be sufficient to allow enough fuel mixture into the carburetor so that the induction cycle is not unnecessarily extended into the compression cycle and so that maximum induction is obtained at high speeds.

The dimensional limitations of the crankcase required for maximum or volumetric efficiency of compression and the size of the reeds required for proper operation and securing within the crankcase are overcome according to the invention by disposing the induction passages 28 adjacent the crankshaft substantially normal thereto in the body of the center main bearing unit 11 substantially as described and allowing for opening clearances of the reeds between the bearing unit and adjacent cheeks of crank throws 12 and 13.

The number of ports 31 and 32 employed for each chamber 14 may vary according to their size and the requirements of the engines.

Various embodiments of the invention may be employed within the scope of the following claims:

I claim:

1. In a two-cycle internal-combustion engine having a pair of alternately firing cylinders, a crankshaft, and a crankcase therefor receiving the fuel mixture for precompression prior to transfer to the engine cylinders, a valve unit controlling the induction of fuel mixture into said crankcase comprising a valve body assembled on said crankshaft and disposed to divide said crankcase into individual crank chambers, said body defining a substantially columnar passage adapted to receive fuel mixture at high velocities and having valve ports arranged about said crankshaft opening oppositely into respective crank chambers, said passage being unobstructed between the corresponding ports of the respective crank chambers, and flexible reed members carried by said valve body normally closing said ports and opening the latter in response to cyclic pressure variations in the respective chambers and the pressure of the fuel mixture by reason of its velocity in said passage between said ports.

2. In a two-cycle internal-combustion engine, a crankcase defining separate adjacent crank chambers and an intermediate columnar passage opening oppositely into said chambers, carbureting means disposed to supply a fuel mixture to said chambers through said passage, adjacent alternately fired cylinders opening into corresponding chambers of said crankcase, pistons reciprocating oppositely in said cylinders and providing for the induction of fuel mixture from said carbureting means through said passages into corresponding crank chambers, and reed valve means controlling said passage normally closing the same and opening the passage to one chamber in response to the movement of the corresponding piston in one direction, said reed valve means being oppositely disposed and unobstructed therebetween whereby opening of said passage by said reed valve means to one of said chambers is effected by the reaction of the fuel mixture within said passage to the closing of said passage to said other chamber.

3. In a two-cycle alternate-firing, two-cylinder internal-combustion engine, a crankshaft, a crankcase for said crankshaft having a fuel inlet port, crankcase bearing members assembled on said crankshaft dividing said crankcase into individual crank chambers and having fuel manifold induction passages registering with said inlet port and having openings oppositely thereof into said crank chambers, said passages being unobstructed between openings, and oppositely disposed valve reeds closing toward each other and opening and closing the respective passages alternately in response to cyclic pressure variations in the respective chambers.

4. In a two-cycle internal-combustion engine including a crankshaft, a crankcase therefor receiving the fuel mixture for precompression, and at least two cylinders opening into said crankcase, a valve unit controlling the induction of fuel mixture into said crankcase comprising a valve body assembled on said crankshaft and disposed to divide said crankcase into individual crank chambers, said body being adapted to receive fuel mixture and having valve ports in opposite ends thereof arranged about said crankshaft and opening into respective crank chambers, and flexible reed members carried by said valve body normally closing said ports and opening and closing the same in response to cyclic pressure variations in the respective chambers, at least one of said ports and reed members being disposed to direct the induction fuel mixture of a chamber into the corresponding cylinder.

5. In an engine including at least two alternate firing cylinders, a crankshaft for said engine and a crankcase providing a separate fuel induction compression chamber including the lower portion of the corresponding cylinder for each crank of said shaft, fuel induction passages provided by said crankcase intermediate said chambers and on either side of said crankshaft, and oppositely disposed valved ports arranged about said crankshaft opening from said passages into said respective chambers in the direction of the corresponding cylinders and in response to cyclic pressure variations therein.

6. In a two-cycle, alternate-firing, two-cylinder engine having a crankcase, crankcase bearing members defining separate crankcase chambers, a crankcase induction system therefor comprising carbureting means disposed adjacent said chambers, a passage within each of said bearing members communicating with said carbureting means at one end and closed by said crankcase at the opposite end and having intermediate ports opening into said chambers and adapted to define an air column between said chambers, and reed valves disposed over said ports normally closing the latter and including oppositely disposed reeds closing toward each other to control said ports, each of said reeds being subject to the pressure wave set up by the closing of the other reed upon opening of the corresponding port in response to reduced pressure within the respective chamber.

ELMER C. KIEKHAEFER.

REFERENCES CITED

The following references are of record in the file of this patent:

UNITED STATES PATENTS

| Number | Name | Date |
|---|---|---|
| 1,845,702 | Evinrude | Feb. 16, 1932 |
| 2,103,564 | Tanner | Dec. 28, 1937 |
| 2,374,959 | Ruppe | May 1, 1945 |
| 2,459,594 | Smith | Jan. 18, 1949 |

FOREIGN PATENTS

| Number | Country | Date |
|---|---|---|
| 204,948 | Great Britain | Oct. 11, 1923 |
| 252,836 | Great Britain | June 6, 1926 |